(12) United States Patent
Bacom et al.

(10) Patent No.: US 7,627,709 B2
(45) Date of Patent: Dec. 1, 2009

(54) COMPUTER BUS POWER CONSUMING DEVICE

(75) Inventors: Scott Edward Bacom, Westminster, CO (US); Matthew Thomas Starr, Lafyette, CO (US); Matthew John Ninesling, Littleton, CO (US); Walter Wong, Boulder, CO (US)

(73) Assignee: Spectra Logic Corporation, Denver, CO (US)

( * ) Notice: Subject to any disclaimer, the term of this patent is extended or adjusted under 35 U.S.C. 154(b) by 117 days.

(21) Appl. No.: 11/609,577

(22) Filed: Dec. 12, 2006

(65) Prior Publication Data
US 2008/0140898 A1    Jun. 12, 2008

(51) Int. Cl.
*G06F 13/00* (2006.01)
(52) U.S. Cl. .................... 710/315; 713/310
(58) Field of Classification Search .......... 710/315, 710/313; 713/300–324
See application file for complete search history.

(56) References Cited

U.S. PATENT DOCUMENTS

| | | | |
|---|---|---|---|
| 6,460,106 B1 * | 10/2002 | Stufflebeam | 710/304 |
| 6,567,876 B1 * | 5/2003 | Stufflebeam | 710/303 |
| 6,983,340 B1 * | 1/2006 | Hermanson et al. | 710/301 |
| 7,363,395 B2 * | 4/2008 | Seto | 710/11 |
| 7,376,147 B2 * | 5/2008 | Seto et al. | 370/465 |
| 2003/0076618 A1 | 4/2003 | Brace et al. | |
| 2003/0154314 A1 * | 8/2003 | Mason et al. | 709/250 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |
| 2005/0063089 A1 | 3/2005 | Starr et al. | |
| 2005/0065637 A1 | 3/2005 | Lantry et al. | |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0219964 A1 | 10/2005 | Pollard et al. | |
| 2005/0246484 A1 | 11/2005 | Lantry et al. | |
| 2005/0267627 A1 | 12/2005 | Lantry et al. | |

(Continued)

FOREIGN PATENT DOCUMENTS

WO    WO 2005/010661 A2    2/2005

OTHER PUBLICATIONS

U.S. Appl. No. 11/126,025, Rector et al.

(Continued)

*Primary Examiner*—Glenn A Auve

(57) ABSTRACT

A power-using device for drawing power over a communication and power bus is provided. The power-using device is adapted to draw only power from the communication and power bus, the bus being connected to a power supply and host computer. The power-using device is further capable of communicating with the bus via a host bus adapter through a communication link not comprised by the bus. The host bus adapter is capable of receiving power and communication from the bus.

17 Claims, 10 Drawing Sheets

U.S. PATENT DOCUMENTS

| | | |
|---|---|---|
| 2006/0064953 A1 | 3/2006 | Wong |
| 2006/0070059 A1 | 3/2006 | Starr et al. |
| 2006/0095657 A1 | 5/2006 | Rector et al. |
| 2006/0112138 A1 | 5/2006 | Fenske et al. |
| 2006/0126209 A1 | 6/2006 | Starr et al. |
| 2006/0134997 A1 | 6/2006 | Curtis et al. |
| 2006/0136688 A1* | 6/2006 | Pang et al. .................. 711/162 |
| 2006/0161936 A1 | 7/2006 | Permut et al. |
| 2006/0164928 A1 | 7/2006 | Starr et al. |
| 2006/0215300 A1 | 9/2006 | Starr et al. |
| 2007/0094472 A1* | 4/2007 | Marks et al. ................ 711/170 |
| 2008/0059795 A1* | 3/2008 | Vogel ........................ 713/165 |

OTHER PUBLICATIONS

U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.
PCT Application No. US05/45168, Dec. 2005, Spectra Logic Corporation.
PCT Application No. US05/46447, Dec. 2005, Spectra Logic Corporation.

* cited by examiner

COMPUTER BUS POWER CONSUMING DEVICE

CROSS-REFERENCE TO RELATED APPLICATIONS

None

FIELD OF THE INVENTION

The present invention relates generally to a power-using device for drawing only power from a communication and power bus while being capable of communication with devices and controllers on the bus, over a pathway other than the bus, by way of a host bus adapter that is connected to the bus for both communication and power.

BACKGROUND

Like many computer related electronics, consumer driven innovations fueled by an insatiable thirst for data storage has diversified an expanding storage industry. This is exemplified by the variety of disc drive storage array systems which are among the many mass storage options available. Disc drive storage arrays are gaining popularity due to the many advances in disc drive technology such as high areal density with a consumer-friendly cost structure and ever faster speeds at which data are storable and retrievable. High disc drive storage speeds have, in turn, necessitated innovations including ways in which data are piped to and from the drives. Such innovations include data paths and protocols such as Serial Advanced Technology Attachment (SATA) used for low cost desktop environments, parallel Small Computer System Interface (SCSI) and Serial Attached SCSI (SAS) used for high performance enterprise environments which include disc drive storage arrays, just to name three examples.

Generations of SAS disc drives have the advantage of parallel SCSI robustness with the added benefit of significantly expanding the SCSI envelope in terms of speed, scalability and flexibility thanks, in part, to recent advancements in Very Large Scale Integration technology. Furthermore, SAS systems have remarkable scalability relative to parallel SCSI systems, made possible by the multiple low-cost switches that comprise an SAS expander. For example, each SAS expander may enable 128 point-to-point connections that, when coupled with additional expanders, such as off of a Host Bus Adapter (HBA), may be able to aggregate thousands of devices while preserving performance and reliability. By contrast, parallel SCSI has an imposed limit of fifteen devices per SCSI chain and limits to total cable length.

In the event additional SAS drives are needed beyond the capacity of the HBA, additional HBAs can be connected to the storage array system bus, often a Peripheral Computer Interface (PCI) bus (most motherboards for a storage array system have at least multiple 32 bit and 64 bit edge connectors). Additional HBAs connected to the main storage array system bus not only have the disadvantage of consuming additional bandwidth, but are expensive. One standard solution is to provide a back plane of a library system, however, this solution requires additional electronics and requires additional accommodating library space.

In an effort to expand data to peripherals beyond the original intent of an HBA while reducing the dependency of a back plane device and coincidentally taking advantage of the geometric layout of a standard PCI bus, solutions drawn to both methods and apparatus are disclosed herein. It is to innovations related to this subject matter that the claimed invention is generally directed.

SUMMARY OF THE INVENTION

The present invention relates generally to a power-using device that works with a communication and power bus and overcomes the disadvantages and limitations of the prior art by providing a method and apparatus for facilitating the drawing of only power from the communication and power bus while maintaining channels of communication with the bus, over a pathway other than the bus, by way of a host bus adapter that is connected to the bus for both communication and power.

One embodiment of the present invention can therefore comprise an expander arrangement comprising: a converter device adapted to convert communication received in a first protocol from a bus to a second protocol, with the converter device adapted to transmit the communication in the second protocol to an expander device over a pathway different from the bus and the bus adapted to provide power to both the converter and expander devices.

Another embodiment of the present invention can therefore comprise a method for routing data from a first device comprising the steps of: receiving power and communication in a first protocol from a bus, converting the communication from the first protocol to a second protocol, and transmitting the communication in the second protocol to a second device over a pathway different from the bus, wherein the second device receives only power from the bus.

Yet another embodiment of the present invention can therefore comprise an expander apparatus comprising: a host bus adapter capable of converting communication received in a peripheral computer interface protocol from a peripheral computer interface bus to a second protocol, and an expander device adapted to draw only power from the bus, the expander device capable of receiving the communication in the second protocol from the host bus adapter over a pathway different from the peripheral computer interface bus for transmission to at least one of a plurality of storage elements.

DETAILED DESCRIPTION

Figure 1:
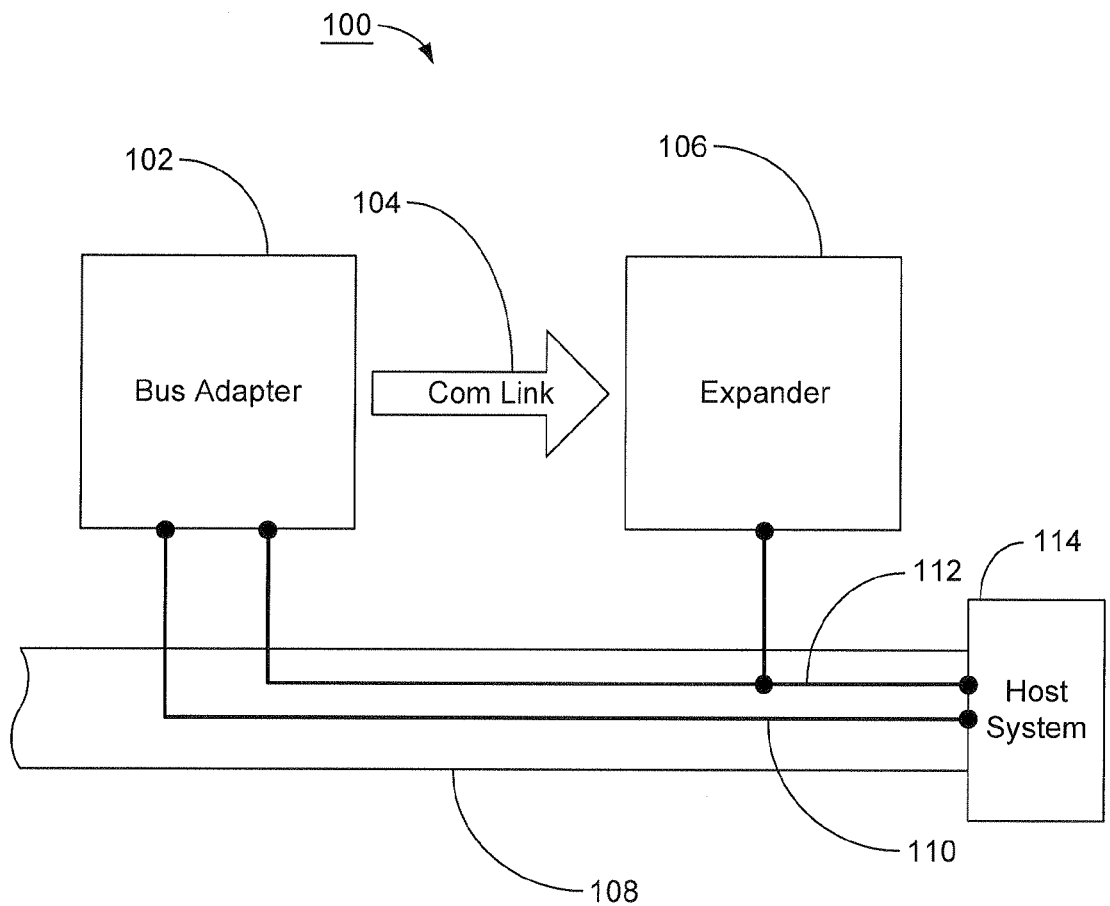
FIG. 1 shows a block diagram of an expander arrangement constructed in accordance with an embodiment of the present invention.

Referring to the drawings in general, and more specifically to FIG. 1, shown therein is a block diagram of an expander arrangement 100 constructed in accordance with an embodiment of the present invention. In what follows, similar or identical structures are identified using identical callouts.

The expander arrangement 100 illustratively comprises a bus 108 for providing power to both an expander device 106 and a bus adapter 102. The bus 108 is also illustratively shown providing a communication link 110 directly (such as wire-line or wireless, for example) to the bus adapter 102. Sometimes referred to as a highway through which data travels within a computer, a bus, in general, is a collection of wires through which data and power are transmitted from one part of a computer to another. Embodiments of the bus can include a Peripheral Component Interconnect (PCI) bus, IBM Corp. PC-AT Industry Standard Architecture (ISA) bus, Computer Area Network (CAN), Universal Serial Bus (USB), PCI express, or Local Area Network (LAN) when referring to a network system, just to name a few examples. The width of a bus determines how much data can be transmitted at one time. For example, a 32-bit bus can transmit 32 bits of data while a 64-bit bus can transmit 64 bits of data.

As illustrated in FIG. 1, the bus adapter 102, such as a Host Bus Adapter (HBA) for example, provides a communication link between a host system 114, such as a computer, to other peripheral devices (i.e. network and storage devices), such as those that can be routed through the expander device 106, such as a Host Bus Expander (HBE) device for example. The bus adapter 102 accomplishes the communication link by converting communication received in a first protocol, for example from the host 114, to a second protocol, for example to be transmitted to the expander device 106 and then on to the peripherals. As illustrated, typically the expander device 106 and the bus adapter 102 are two different devices that are each adapted to connect to the power line(s) 112 in the bus 108. As illustratively shown, the bus adapter 102 is adapted to communicate with the host system 114 along the communication link 110 in the bus 108 and adapted to communicate with peripheral devices via the expander device 106 along a communication link 104 that is along a different pathway than the bus communication link 110.

Figure 2A:
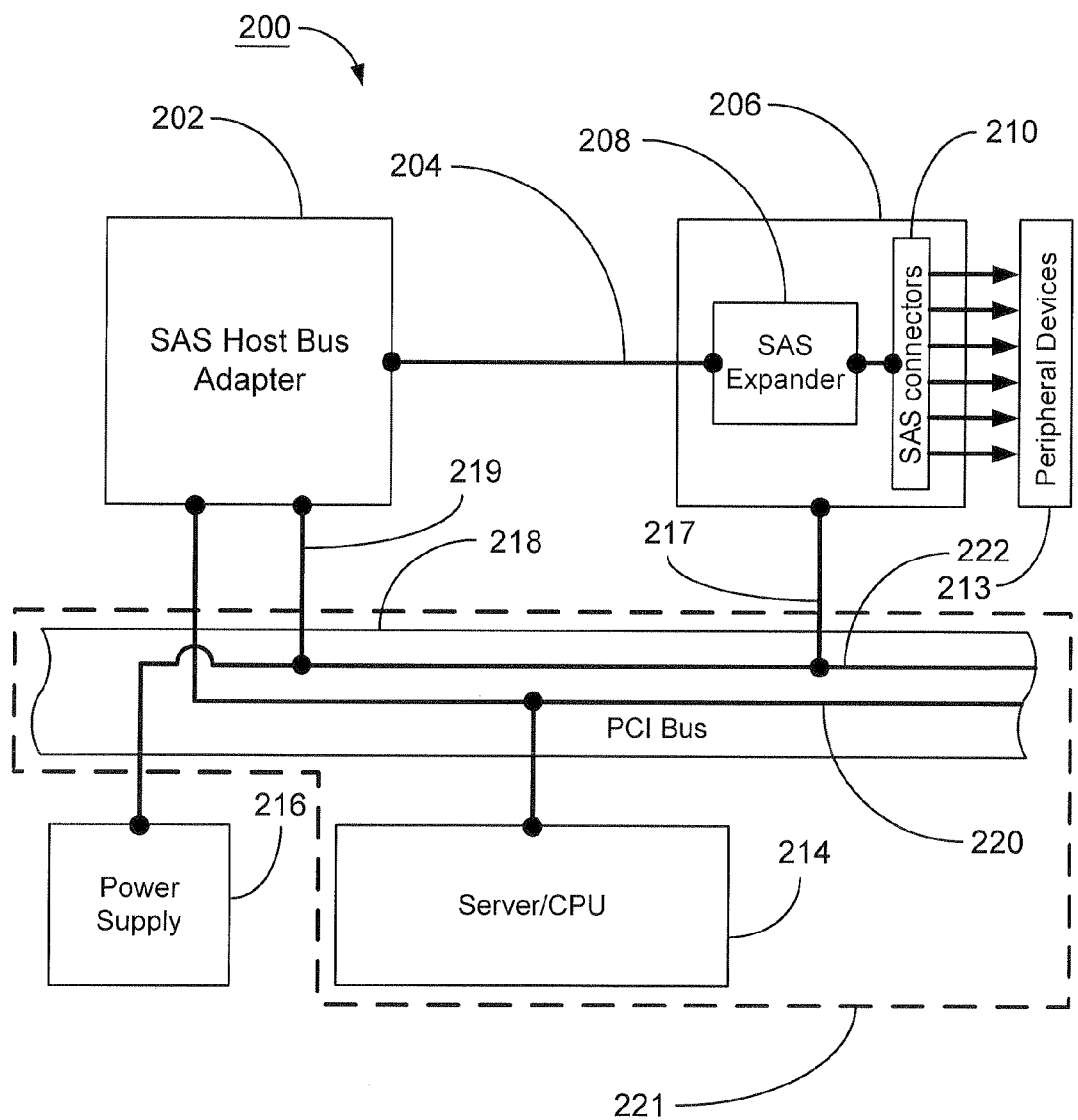
FIG. 2A shows a block diagram of communication between a server/CPU adapted to communicate using a first protocol and peripheral devices adapted to communicate using a second protocol via a host bus adapter and expander device in accordance with embodiments of the present invention.

FIG. 2A is a block diagram of one embodiment of the present invention showing communication between a server/cpu 214 adapted to communicate using a PCI protocol and peripheral devices 213 adapted to communicate using the SAS protocol. As illustratively shown, power is transmitted by a power supply 216 along a power line(s) 222 comprised by a PCI bus 218. SAS HBA 202 is linked to the power line 222 along power pathway 219 and the SAS HBE device 206 is linked to the power line 222 along power pathway 217. Both power pathways 217 and 219 can be connectors, such as female edge connectors adapted to receive male edge connectors that are generally associated with Printed Circuit Board Assemblies (PCBA), known to those skilled in the art. In one embodiment, the PCI bus 218 and server/cpu 214 can be included on a PCBA mother board, shown herein as a dashed boundary 221. In yet another embodiment of the present invention, the server/CPU 214 is not integrated on a PCBA 221, but rather, is connected to the PCBA 221, such as via an edge connector, for example.

The SAS HBA 202 is adapted to be the communication link between the server/cpu 214 that operates in a PCI environment and SAS storage devices 213. In general, during a PCI data transfer, or bus transaction, there are three primary operations that occur, namely, set-up operations, data transfer operations and acknowledgement operations. The set-up operations include bus arbitration operations (the initiating target device, such as the server/cpu 214, is given permission to use the bus), initiation of target addresses, the HBA 202, and transfer types, assertion of device select signals, etc. followed by an acknowledgement that the transaction is ready to proceed. Following the set-up operations, the transaction enters into a data transfer phase. Once the data transfer phase is completed, or terminated, an acknowledgement phase is carried out which basically checks the data and acknowledges a completion status of the operation. Hence, the operation of setting up a transaction between the SAS HBA 202 and the server/cpu 214 requires some amount of time, however, once accomplished, data can be transmitted to the SAS HBE 206 and routed to the storage devices 213 via SAS connectors 210 comprised by the HBE device 206. By sending data through one SAS HBA 202 and then on to an HBE device 206 over a different pathway than the bus 218, shown by the HBA/HBE link 204, for data distribution, set-up and acknowledgment operation time can be minimized to one target, the SAS HBA 202. In contrast, multiple HBAs may consume bus bandwidth by dealing with multiple target devices (i.e. multiple set-ups and acknowledgements).

Figure 2B:
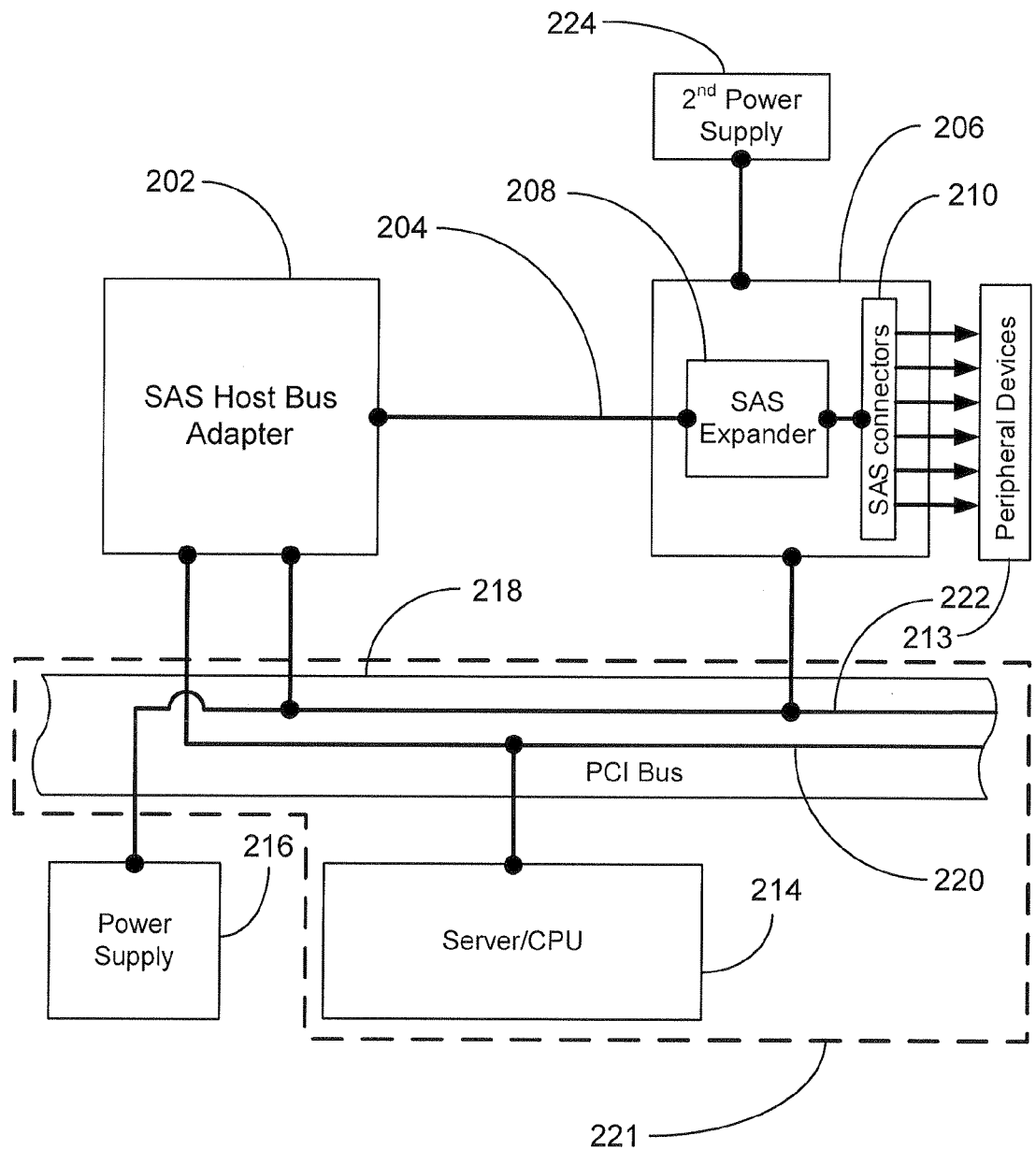
FIG. 2B shows a block diagram illustrating an expander device receiving power from both the bus and a second power supply in accordance with another embodiment of the present invention.

FIG. 2B is a block diagram of yet another embodiment of the present invention showing communication between the server/cpu 214 that communicates using a PCI protocol and peripheral devices 213 adapted to communicate using SAS protocol wherein power is supplied by both the PCI bus 218 and a second power supply 224. The HBE device 206 is provided with additional power from the second power supply 224 in order to service additional peripheral devices (not shown) requiring power beyond what the power supply line(s) 222 in the bus 218 can provide. Such peripheral devices can include fans, lights, additional chipsets, etc. In another alternative embodiment of the present invention, the second power supply 224 can be replaced by an 'out of bus' power line from the first power supply 216.

Figure 2C:
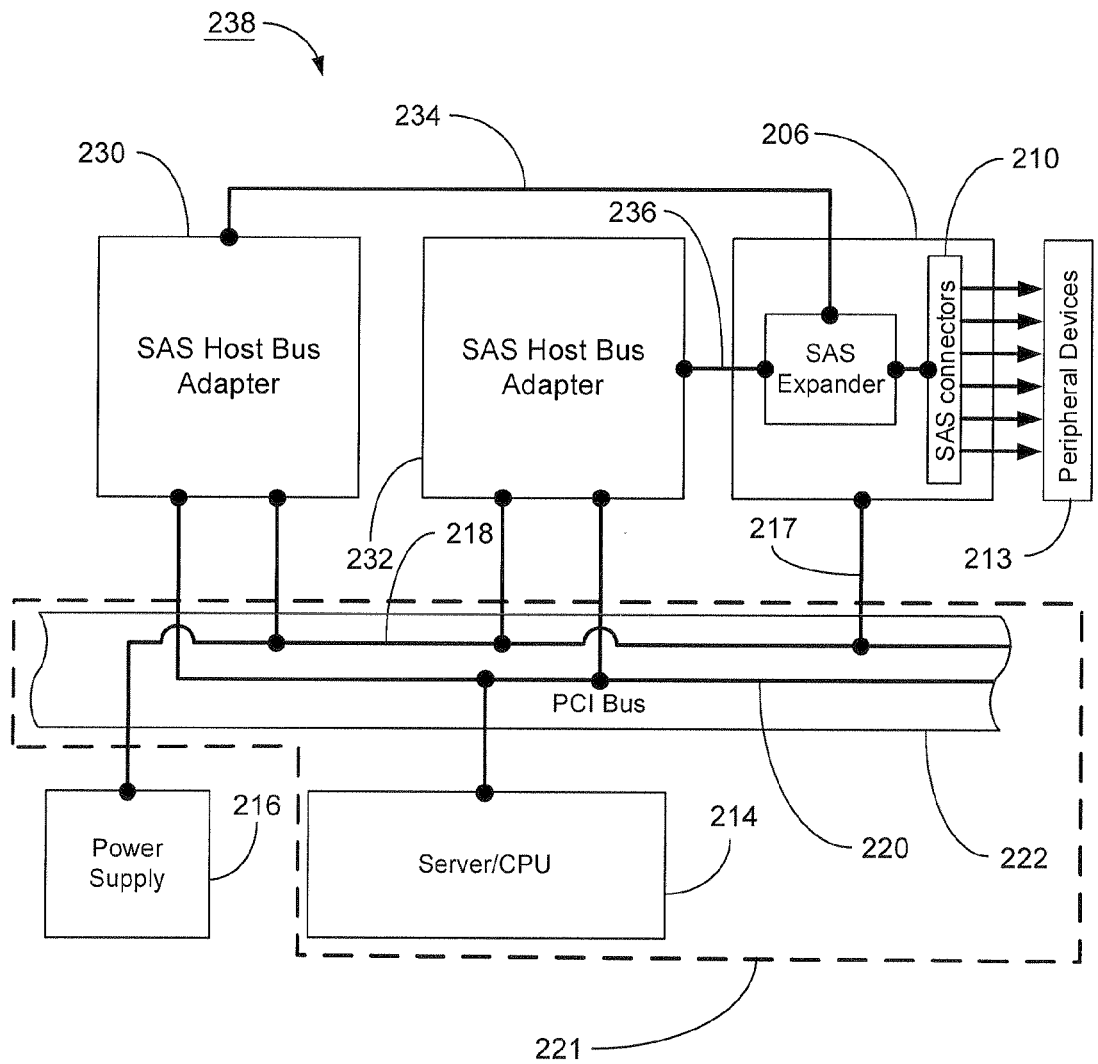
FIG. 2C shows a block diagram illustrating two host bust adapters and one expander device in accordance with embodiments of the present invention.

FIG. 2C is a block diagram of yet another embodiment of the present invention illustrating a first and second HBA 230 and 232 configured to cooperate with an SAS HBE device 206. The first and second HBA 206 are communicatively linked to the HBE device 206 along first and second pathways 234 and 236 that are different from the communication pathway 220 comprised by the bus 222. As illustrated the HBE device 206 is not communicatively linked with the bus 222, but, along with the first and second HBAs 230 and 232, is powered by the bus 222. In the event of an HBA failure, the first and second HBAs 230 and 232 can, among other benefits, provide an added advantage of redundant protection to the system 238.

Figure 2D:
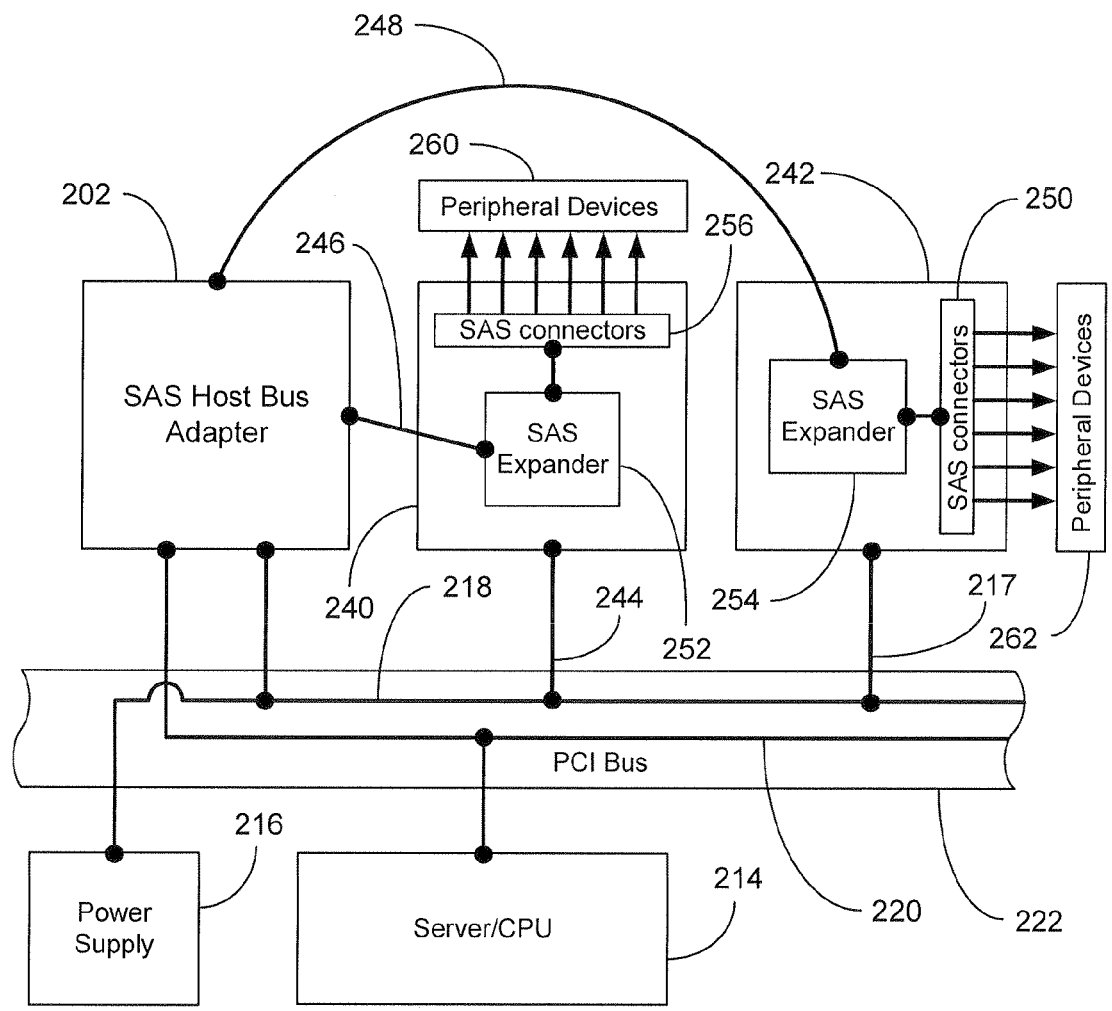
FIG. 2D shows a block diagram illustrating one host bust adapter and two expander devices in accordance with embodiments of the present invention.

FIG. 2D is a block diagram of yet another embodiment of the present invention illustrating a first and second HBE device 240 and 242 configured to cooperate with an HBA 202. The first and second HBE devices 240 and 242 are communicatively linked to the HBA 202 via a first and second pathway 246 and 248 that are different from the communication pathway 220 comprised by the bus 222. Each HBE device 240 and 242 comprise respective SAS expander chips 252 and 254 that route communication converted by the HBA 202 to respective peripherals 260 and 262 via respective connectors 256 and 250. This configuration provides additional expanding capability beyond a system with one HBE device, such as the system 200 shown in FIG. 2A.

Figure 3:
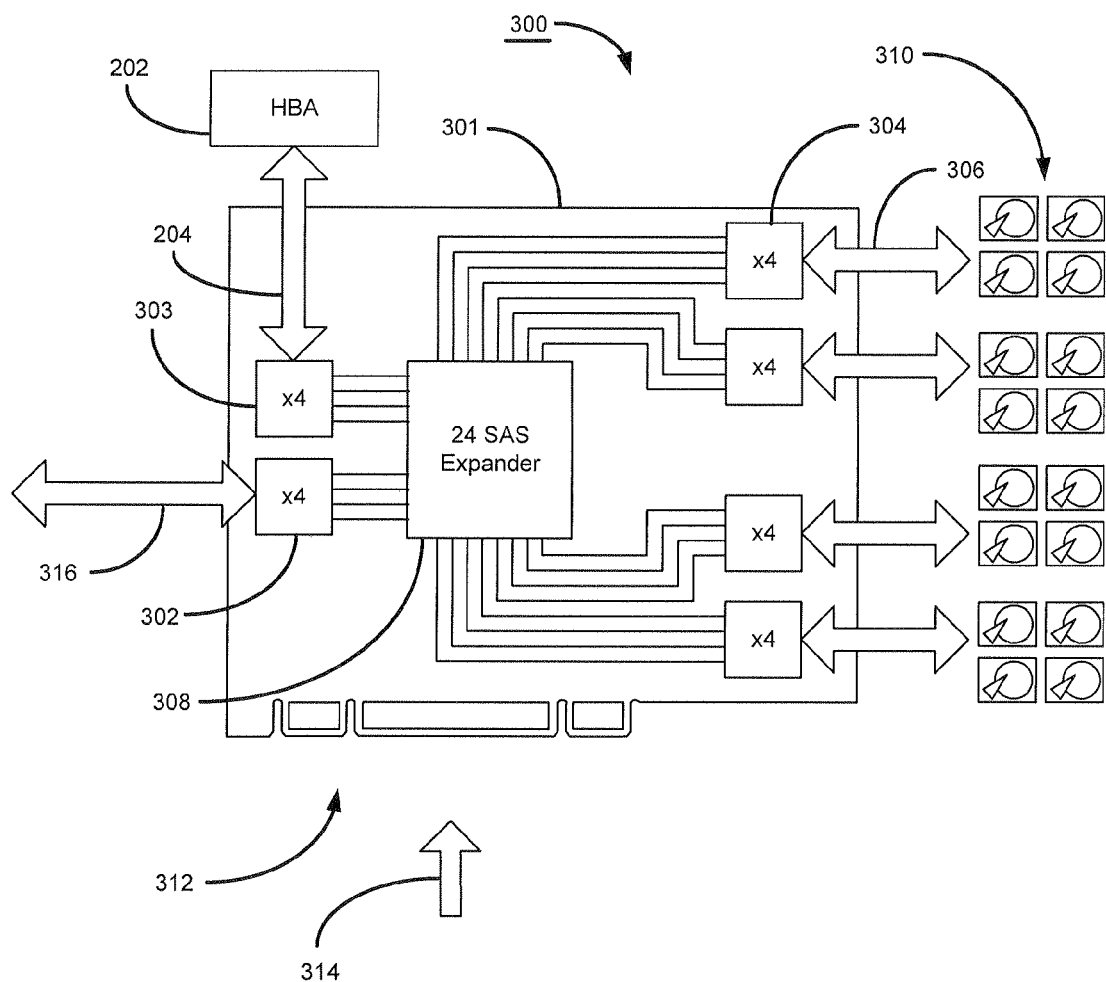
FIG. 3 is a block diagram of an expander device consistent with embodiments of the present invention.

FIG. 3 is a block diagram of an embodiment of an HBE device 300 consistent with embodiments of the present invention. The HBE device 300 can be a PC board 301 that is illustratively shown accommodating a 24-port SAS expander chip 308, five 4-channel in-chassis SAS connectors 303 and 304 (for 'in-chassis' connections made substantially within a chassis, or housing, comprising a mother board) and one 4-channel external SAS connector 302. The 4-channel SAS connectors 302, 303 and 304 are electrically connected to the 24-port SAS expander chip 308. Each 4-channel in-chassis connector 304 is capable of accommodating mating SAS plugs (not shown) typically attached at the end of an SAS cable, illustrated by the arrows 306, for transmitting data to and from four peripheral devices, which in the instant case are disc drives 310. The HBA 202 receives and transmits communication along the SAS link 204 in SAS protocol. The HBA 202 is further adapted to be connected to the bus, such as the bus 218 from FIG. 2A, wherein power and communication are received directly from the bus. The communication from the bus is received in a bus protocol, such as a PCB protocol, and converted in the HBA 202 to the communication over a different protocol, such as the SAS protocol. Power is provided along a power pathway arrow 314 via a 32 bit male edge connector 312 whereby the edge connector 312 mates with a compatible female edge connector (not shown). In an alternate configuration, a PCIe can be optionally used for the HBA as well as the HBA. The edge connector 312 is configured to receive power and not data. The external SAS connector 302, accessible from outside of the chassis, can be used to connect other optional devices, such as at least an additional expander device or another motherboard for example. As one skilled in the art will appreciate, the 32-bit edge connector is only one illustrative example of a number of different form factor connectors that are available.

Figure 4A:
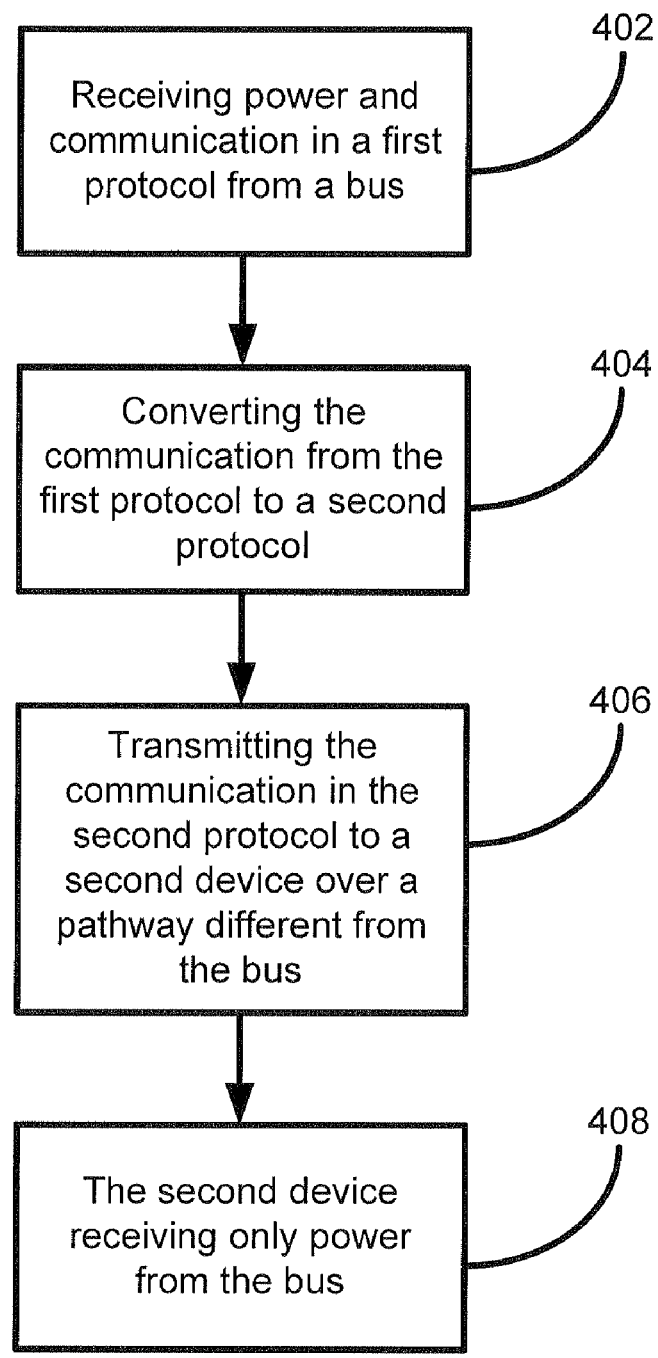
FIGS. 4A and 4B are block diagrams showing some methods wherein some embodiments of the present invention can be practiced.

Referring now to FIG. 4A in conjunction with FIG. 2A, shown therein is a method to practice an embodiment of the present invention. It should be recognized that the steps presented in the described embodiments of the present invention do not necessarily require any particular sequence. As shown in step 402, a first device, such as the HBA 202, receives power and communication in a first protocol from a bus, such as the bus 218. The first device then converts the communication in the first protocol to a second protocol, as shown in step 404. As shown in step 406, the converted communication is then transmitted to a second device, such as the HBE 206, in the second protocol over a pathway, such as pathway 204, that is different from the bus wherein the second device receives only power from the bus, such as from the power line 222.

Figure 4B:
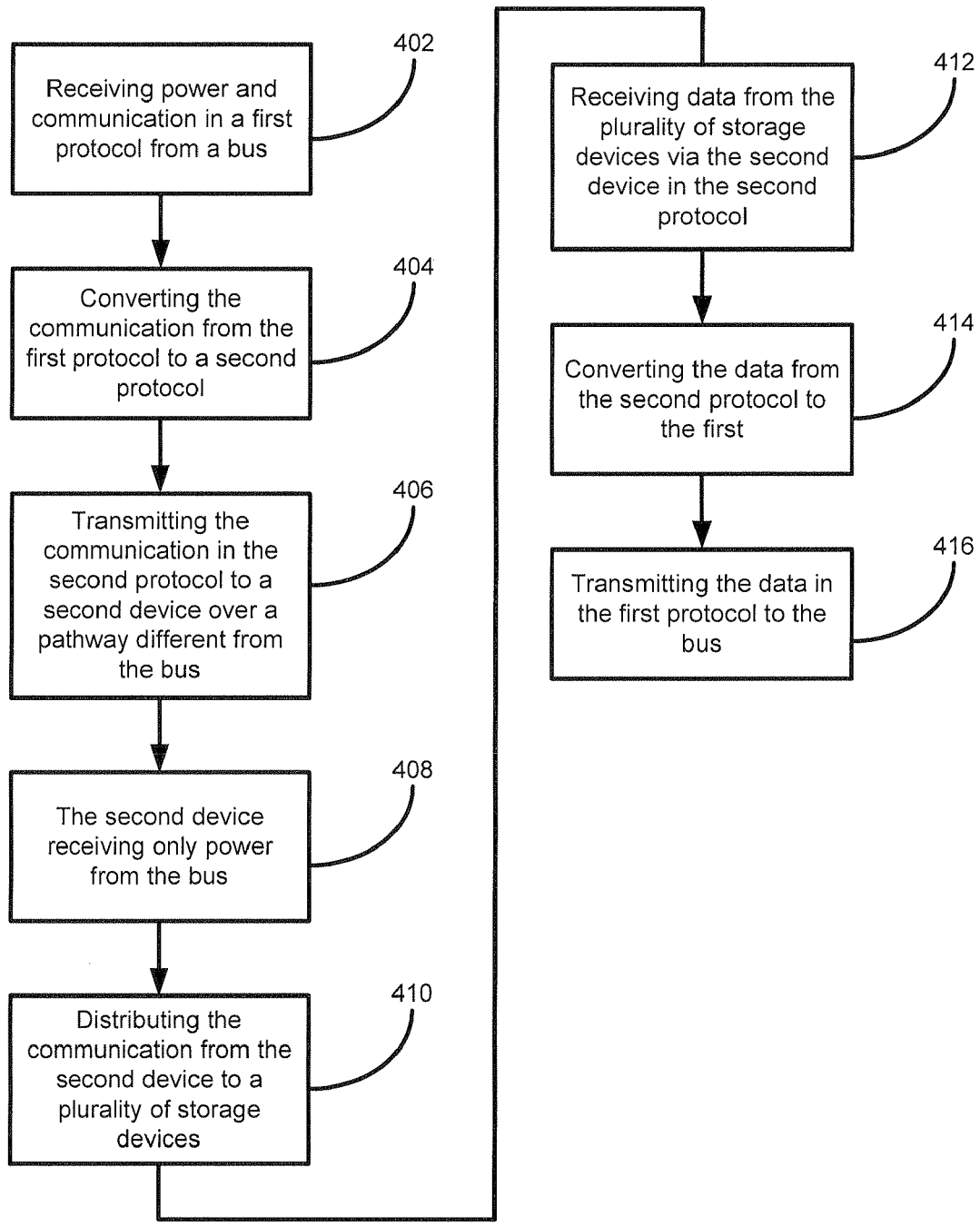

With reference to FIG. 4B in conjunction with FIG. 2A, shown therein is an alternative method consistent with some embodiments of the present invention which includes method steps 402-408 from FIG. 4A. As shown in step 410, the second device distributes the communication to a plurality of storage elements, such as disc drives or other peripheral storage devices, for storage. The communication from the storage elements can also be piped in the opposite direction as illustrated in steps 412-416. The first device can receive data from the plurality of storage elements, such as over the communication link 204, via the second device in the second protocol, as shown in step 412. As shown in step 414, the first device can then convert the data received from the plurality of storage elements via the second device from the second protocol back to the first protocol followed by transmitting the data in the first protocol along the bus back to a host or client, such as the host system 114 of FIG. 1, as shown in step 416.

Figure 5:
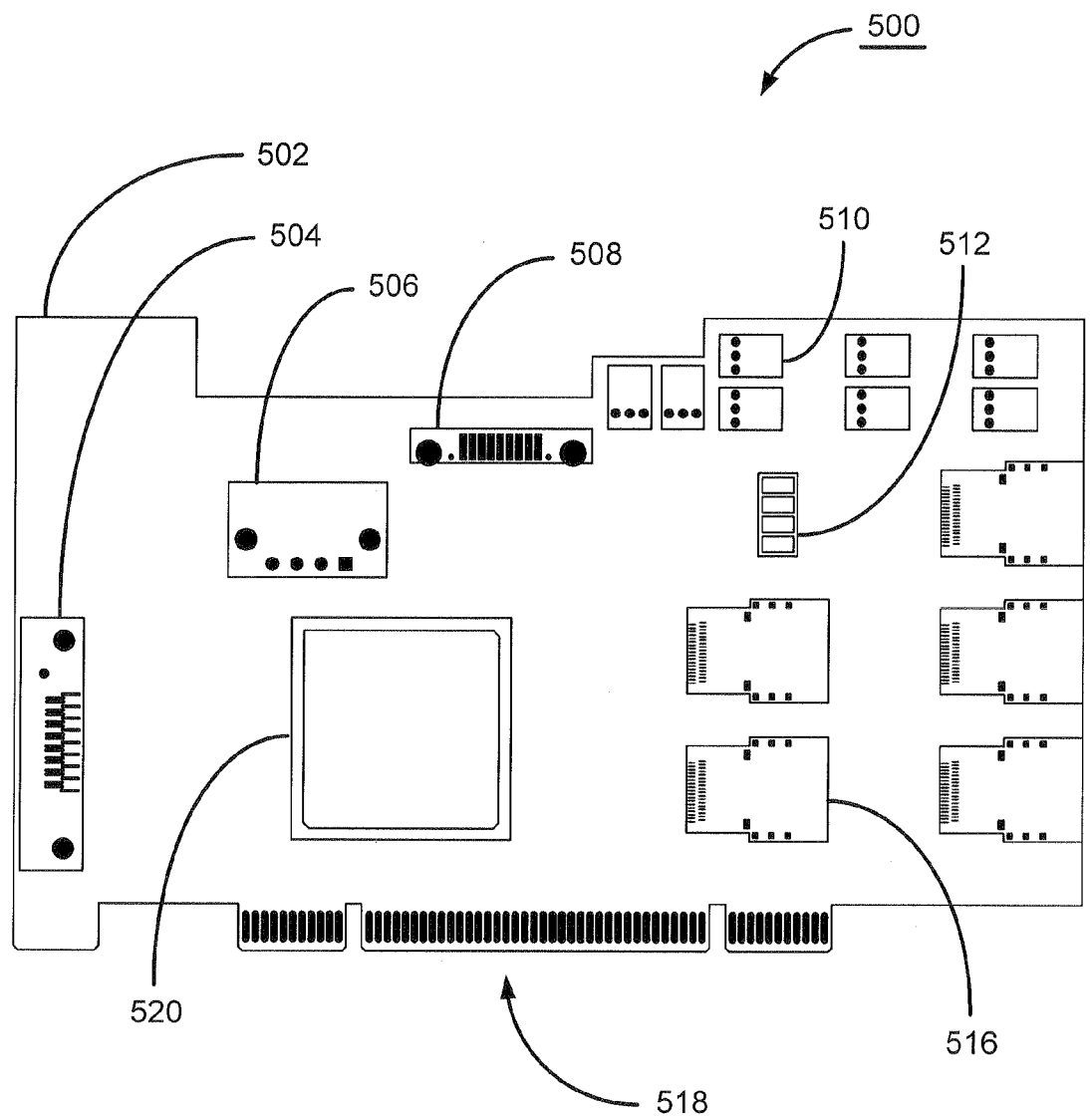
FIG. 5 is a simplified illustration of a host bus expander device capable of being used in conjunction with a Spectra Logic D-500 disc drive array storage system consistent with embodiments of the present invention.
Figure 6:
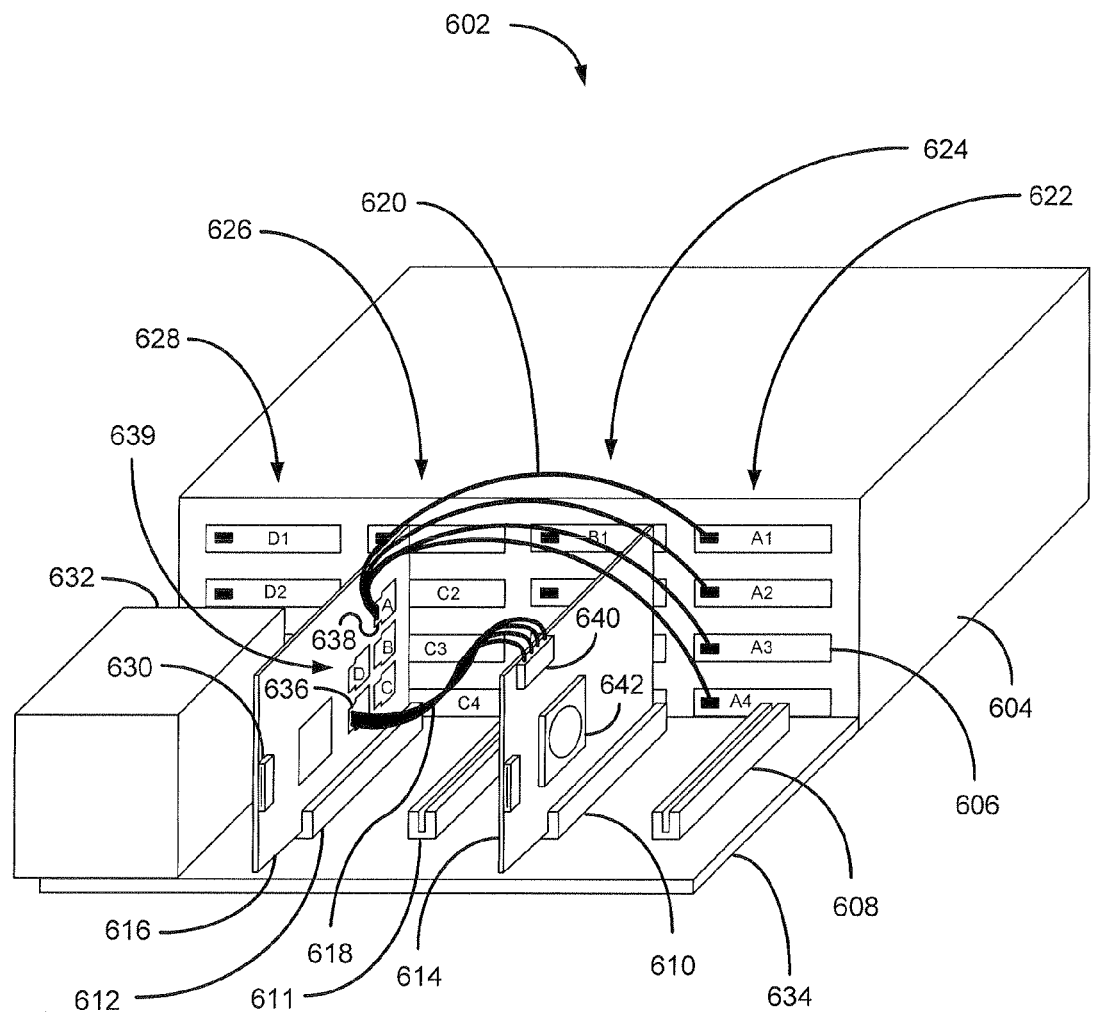
FIG. 6 is an illustration of a Spectra Logic D-500 disc drive array storage system wherein embodiments of the present invention can be commercially practiced.

As illustratively shown in FIGS. 5 and 6, embodiments of the present invention can be commercially practiced, for example, in connection with a Spectra Logic D-500 disc drive array storage system sold by Spectra Logic Corporation of Boulder, Colo. As will be elaborated on in further detail, FIG. 6 is a simplified perspective illustration of the D-500 disc drive array storage system 602 which is capable of utilizing the storage capacity of sixteen disc drives 606, shown therein arranged in four groups of four: A1-A4, B1-B4, C1-C4 and D1-D4 622, 624, 626 and 628 respectively. The disc drives 606 can be arranged to operate as a Virtual Tape Library, in any number of Redundant Array of Disc Drives or as individual storage devices, just to name three examples.

With reference to FIG. 5 in conjunction with FIG. 6, a simplified illustration of an embodiment of an HBE 500 capable of being used in conjunction with the D-500 disc drive array storage system 602 is shown therein. The HBE 500 is structurally comprised of a PC board 502 adapted to support a variety of electronic components and integrated circuit chips capable of carrying out expansion capabilities of the module 500. The HBE 500 is equipped with a 32-bit male edge connector 518 adapted to receive substantially 10 watts of power at 5 volts from a 32-bit female edge connector electrically linked with a PCI bus (not shown) integrated with a PC mother board 634. The HBE 500 is further adapted to receive additional power via a 5V/12V power plug 506 that can be used to power additional devices, such as fans for example, connectable via any of the eight accessory connectors 510. A toggle switch 512 can be used to select either power from the 5V/12V power plug 506, from the edge connector 518 from the PCI bus or both. The expansion engine HBE 500 is a 24-port expander chip 520, such as a Vitesse VSC-7153 port expander from Vitesse Corporation of Camarillo, Calif., adapted to route information to and from twenty four target devices (not shown). The HBE 500 comprises five internal to chassis 604 4-port SAS connectors 516, such as the Molex mini 4i connectors from Molex Corporation of Lisle, Ill. In one embodiment of the present invention, one of the internal 4-port SAS connectors 516 can be used to connect to an HBA, such as HBA 614, and the other four internal 4-port SAS connectors 516 can be used to connect with SAS capable disc drive storage units 606. The HBE 500 also comprises an external 4-port SAS connector 504 that is accessible from outside the chassis 604 and is capable of linking additional devices, such as other storage elements, storage libraries and/or expanders just to name several examples. The HBE 500 can comprise one or more debug connectors 508, such as a serial debug connector to configure and control the 24-port expander chip 520. The HBE 500 can be configured to convert power received from the edge connector 518 to 1.2V, 1.8V and 3.3V typically used for logic circuits and data communication.

Referring back to FIG. 6 in conjunction with FIG. 5, the general components shown in the D-500 602 include a power supply 632, HBE 616, HBA 614, four female edge bus connectors 608, 610, 611 and 612, a mother board 634 and sixteen disc drives 606 arranged in groups of four: A1-A4, B1-B4, C1-C4 and D1-D4 622, 624, 626 and 628 respectively, all substantially enclosed by a chassis 604, shown therein partially revealed to show the aforementioned general components. The power supply 632 is capable of providing power to at least the bus (or busses) comprised by the mother board 634, and in one embodiment can provide power directly to the HBE 616 via the 5V/12V power plug 506. The mother board 634 is shown providing a first bus connector 612 linked with the HBE 616 via a male edge connector (not shown), a third bus connector 610 linked with the HBA 610 via a male edge connector (not shown), and a second and fourth available bus connector 611 and 608. Similar to the HBE 500 of FIG. 5, the HBE 616 provides five 4-port SAS connectors, one 4-port connector 636 of which is connected to a four channel SAS port 640 provided by the HBA 614 via a 4 channel cable 618. The HBA 614 receives both power and host communication via the PCI bus comprised mother board 634. The HBA 614, and more specifically, the conversion chip 642, further converts the host communication by the PCI bus from a PCI protocol to SAS protocol in order to transmit the host communication to SAS protocol peripheral disc drive devices. Conversely, SAS protocol communication from a SAS peripheral device is converted to a PCI protocol for transmission to the mother board 634 via the conversion chip 642. The HBE 616 provides four 4-channel SAS port connectors, of which connector 'A' 638 is linked to disc drives A1-A4 622 via a Serial ATA style SAS four channel SAS 'fan-out' cable. The other drives, B1-B4 624, C1-C4 626 and D1-D4 628 are shown not connected to their respective 4-channel SAS port connectors B, C and D collectively labeled 639. The HBE 616 also provides an external 4-channel SAS port 630 for connecting the D-500 602 to another library(s) or other peripherals. As illustratively shown in this embodiment, the circuit boards comprising the HBE 616 and HBA 614 are arranged vertically for space efficiency considerations. Further, as illustratively shown, the HBA 614 is only capable of providing four channels of communication. The HBE 616 provides modularity of a plug-in expander board utilizing only power provided by the mother board 634 thus taking advantage of space and the readily available power source provided by the mother board 634, hence optimizing space, eliminating add-on power supplies and reducing the need for a backplane. Hence, the HBE 616 is an embodiment of a power-using device for drawing power over a communication and power bus. The power-using device, again the HBE 616 in this embodiment, is adapted to draw only power from the communication and power bus, the bus being connected to a power supply and host computer, in the instant case the power supply 632 and the mother board 634. The power-using device is shown capable of communicating with the bus (embedded in the mother board 634) via a host bus adapter 614 through a communication link 618 not comprised by the bus. The host bus adapter 614 is capable of receiving power and communication from the bus. In another embodiment of the present invention, a mother board can be modularly plugged into one of the edge connectors, such as the edge connector 608 for example, affording an additional level of modularity and upgradability.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple HBE boards, such as HBE 616, can be used to further expand the library while still maintaining substantially the same functionality without departing from the scope and spirit of the present invention. Another example can include using the described techniques in devices other than libraries that have space for expandability and can provide power for expandability while maintaining substantially the same functionality without departing from the scope and spirit of the present invention. Finally, although the preferred embodiments described herein are directed to disc drive systems and arrays, such as the Spectra Logic D-500 library and related technologies, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An expander arrangement comprising a converter device, an expander device, and a bus,
   the converter device adapted to convert communication received in a first protocol from the bus to a second protocol and adapted to transmit the communication in the second protocol to the expander device over a pathway different from the bus, the expander device capable of providing power to an accessory device wherein at least a portion of communication to control the accessory device is provided by the converter device over the pathway, and
   the bus adapted to provide power to both the converter and expander devices.

2. The expander apparatus of claim 1 wherein the converter device and the expander device both connect to the bus via a peripheral computer interface bus connector.

3. The expander apparatus of claim 2 wherein the connector is a universal primary peripheral computer interface edge connector.

4. The expander apparatus of claim 1 wherein the first protocol is a peripheral computer interface protocol and the second protocol is a serial attached small computer systems interface protocol.

5. The expander apparatus of claim 1 wherein the converter device is a host bus adapter board.

6. The expander apparatus of claim 1 wherein the expander device comprises a serial attached small computer systems interface expander.

7. The expander apparatus of claim 1 wherein the expander device is capable of routing communication between the converter device and a plurality of storage elements.

8. The expander apparatus of claim 7 wherein the storage elements are disc drives.

9. The expander apparatus of claim 1 wherein the expander device is capable of receiving power from a second source.

10. The expander apparatus of claim 1 wherein the pathway is selected from one of the group consisting of: wireline, radio frequency, laser pulse transmission, flexible electrical contact or microwave.

11. The expander apparatus of claim 1 further comprising a second expander device adapted to receive the communication in the second protocol from the converter device over a second pathway different from the bus and wherein the second expander device is only capable of receiving power from the bus.

12. The expander apparatus of claim 1 further comprising a second expander device adapted to receive the communication in the second protocol from the expander device over a second pathway different from the bus and wherein the second expander device is only capable of receiving power from the bus.

13. The expander apparatus of claim 1 wherein the converter device is comprised by a host bus adapter card adapted to connect to the bus via a first edge connector and wherein the expander device is comprised by a host bus expander adapted to connect to the bus via a second edge connector.

14. An expander arrangement comprising a converter device, an expander device, and a bus,
the converter device adapted to convert communication received in a first protocol from a bus to a second protocol and adapted to transmit the communication in the second protocol to the expander device over a pathway different from the bus, wherein the expander device is capable of receiving power from a second source, and
the bus adapted to provide power to both the converter and expander devices.

15. An expander arrangement comprising a converter device, an expander device, and a bus,
the converter device adapted to convert communication received in a first protocol from a bus to a second protocol and adapted to transmit the communication in the second protocol to the expander device over a pathway different from the bus, wherein the expander device is capable of providing power to an accessory device wherein at least a portion of communication to control the accessory device is provided by the converter device over the pathway, and
the bus adapted to provide power to both the converter and expander devices.

16. An expander arrangement comprising a converter device, a first and a second expander device, and a bus,
the converter device adapted to convert communication received in a first protocol from a bus to a second protocol and adapted to transmit the communication in the second protocol to the first expander device over a pathway different from the bus, and the bus adapted to provide power to both the converter and expander devices;
the second expander device adapted to receive the communication in the second protocol from the converter device over a second pathway different from the bus wherein the second expander device is only capable of receiving power from the bus.

17. An expander arrangement comprising a converter device, a first and a second expander device, and a bus,
the converter device adapted to convert communication received in a first protocol from a bus to a second protocol and adapted to transmit the communication in the second protocol to the first expander device over a pathway different from the bus, and the bus adapted to provide power to both the converter and expander devices;
the second expander device adapted to receive the communication in the second protocol from the expander device over a second pathway different from the bus and wherein the second expander device is only capable of receiving power from the bus.

* * * * *